United States Patent [19]

Knebel et al.

[11] 4,407,444
[45] Oct. 4, 1983

[54] THERMOSTATICALLY CONTROLLED MIXER BATTERY

[75] Inventors: Werner Knebel, Iserlohn; Norbert Ronzon, Balve; Eugen Weidner, Iserlohn, all of Fed. Rep. of Germany

[73] Assignee: Firma Knebel & Röttger, Iserlohn, Fed. Rep. of Germany

[21] Appl. No.: 318,310

[22] Filed: Nov. 4, 1981

[30] Foreign Application Priority Data

Nov. 7, 1980 [DE] Fed. Rep. of Germany ....... 3041979

[51] Int. Cl.³ ............................................ G05D 23/13
[52] U.S. Cl. ............................. 236/12.1; 137/625.41; 236/93 A
[58] Field of Search ................. 236/12.1, 12.16, 12.17, 236/12.23, 93 A, 99 R, 99 J, 99 K, 100; 137/625.41, 637

[56] References Cited

U.S. PATENT DOCUMENTS

| | | | |
|---|---|---|---|
| 2,267,976 | 12/1941 | Hermann | 137/79 X |
| 2,984,388 | 5/1961 | Scarr et al. | 137/625.41 X |
| 3,951,169 | 4/1976 | Loose | 137/625.41 |
| 3,987,819 | 10/1976 | Scheuermann | 137/625.41 X |
| 4,327,758 | 5/1982 | Uhlmann | 137/625.41 |

FOREIGN PATENT DOCUMENTS 2804755  8/1979  Fed. Rep. of Germany ........ 236/12

*Primary Examiner*—William E. Tapolcai
*Attorney, Agent, or Firm*—Allison C. Collard; Thomas M. Galgano

[57] ABSTRACT

A thermostatically controlled mixer battery. The appropriate mixer battery having plate control means 2 comprising at least one rotatable control plate 24 for controlling the quantity of water delivered and manually actuable from externally by a user, the plate 24 having bores 243, 244 selectively alignable with hot and cold water inlet bores 233, 234 and a temperature control plate 25, which is thermostatically actuated and is sealingly displaceable relative to the quantity control plate 24, the plate 25 having bores 253, 254 formed therein which permit the hot and cold water to pass therethrough in a desired ratio to a mixing chamber 15.

7 Claims, 7 Drawing Figures

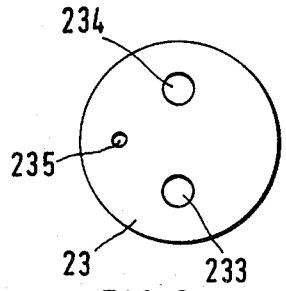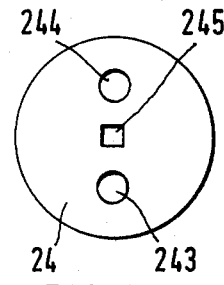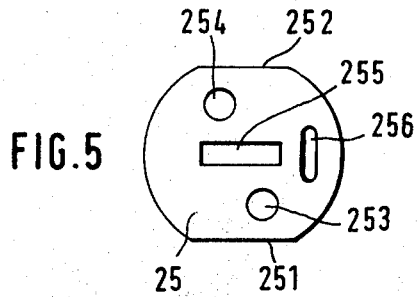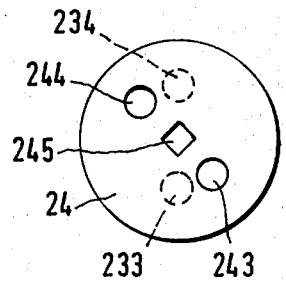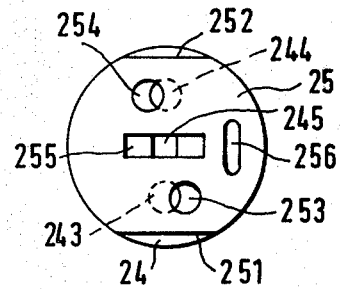

THERMOSTATICALLY CONTROLLED MIXER BATTERY

The present invention relates to a thermostatically controlled mixer battery which can be utilized into water systems.

A thermostatically controlled mixer battery is known which has a hot and a cold water inlet located therein. A control member passes over the top of these inlets and is displaceable in a reciprocating manner. The control member is actuated by a thermostatic expansion element. The element is located in a mixing chamber and the water flows therearound. The quantity and temperature of the mixed water supplied is controllable by manually operated control devices.

In such a mixer battery, the temperature of the mixed water delivered is adjustable within a preset temperature and is kept substantially constant at a desired value by thermostatic control means. The quantity of water to be supplied can be regulated independently of the temperature.

A thermostatically controlled mixer battery is also known, in which a control piston is displaced in an axial direction by an expansion element. The control piston has corresponding guide bores reciprocating over hot and cold water inlet bores formed in the battery housing. By limiting the expansion travel of the expansion element by means of an external handle member having a graduated scale marked thereon, the temperature of the delivered mixed water is preset. The quantity of water delivered is regulated independently by means of a lever or control device rotatable from externally. The inlets for the hot and cold water are, therefore, both opened or both closed. After the quantity regulating valves have been opened, the hot and/or cold water is located in the region of bores formed in a radial bush in which the control piston is displaced by the expansion element. The water then flows into a mixing chamber in which it flows around the expansion element and then to the outlet.

Such means for controlling the piston suffer from the disadvantage that radial seals must be utilized, which seals wear and adversely affect the operational reliability of the battery.

The present invention therefore seeks to provide a thermostatically controlled mixer battery having simple, operationally reliable, control means for regulating the temperature and quantity of water being delivered.

According to the present invention, there is provided a thermostatically-controlled mixer battery comprising a housing defining a mixing chamber in which a thermostatic expansion element is located, the element, in use, having water flowing therearound and thermostatically controlling a control member, displacement of the control member by the element causing hot and/or cold water inlets to the mixing chamber to be opened or closed, the thermostatic control element being adjustable within a preselected operating range so as, in use, to deliver a mixture of hot and cold water at a desired temperature, the quantity of the incoming hot water and cold water being regulatable by a manually operable valve, wherein a plate control means is provided, the plate control means comprising at least one rotatable quantity control plate having bores formed therein, the quantity control plate being rotatable from the exterior of the housing and being so disposed as to travel over, in use the hot and cold water inlet bores such that the inlet bores are selectively alignable with the bores in the control plate, a temperature control plate actuated by the thermostatic expansion element being provided, the temperature control plate being sealingly displaceable relative to the quantity control plate and having bores formed therein selectively alignable with the bores in the quantity control plate to hot water and cold water to pass therethrough into the mixing chamber.

In such a mixer battery, the quantity of incoming hot and cold water is regulated directly by the rotation of a plate. This plate is preferably, made of a ceramic material. The temperature control plate, which acts sealingly against the quantity control plate, is reciprocatable and is moved in the desired direction by the expansion element of a thermostat. No additional seals are required between the control plates. A simple passage for the water is rendered possible, because the quantity control plate overtravels the hot and cold water inlets in the manner of a common inlet valve, and the water can flow through the temperature control plate directly to the mixing chamber and then to the outlet.

Preferably, a valve seat plate is sealingly located in a cylindrical receiving device provided in the battery housing, the valve seat plate having bores formed therein, which bores form respectively the hot and water inlets, said bores being coaxially disposed over the ends of the hot and cold water inlet conduits, the rotatable quantity control plate being coaxially disposed on the valve seat plate, the temperature control plate being located on the quantity control plate and being reciprocatably displaceable relative thereto, guide means being provided for guiding the temperature control plate during such displacement, the bores formed in the temperature control plate being in open communication with the mixing chamber and with an outlet from the battery.

In a mixer battery having such features, three plates are provided, the lowermost plate being fixed and forming the valve seats for the quantity regulating valve. The quantity control plate is disposed thereabove and is rotatable from externally. The temperature control plate which, in turn, acts against the quantity control plate, is displaceable in a direction at right angles to the axis of rotation of the plates by means of the expansion element. The mixing chamber is disposed above the uppermost plate and is in open communication with the outlet. This produces a very simple construction for the mixer battery.

Advantageously, a slotted opening, the major axis of which extends in the direction of displacement of the temperature control is formed in the temperature control plate, the slotted opening being capable of permitting the passage therethrough of one end portion of a spindle member, the spindle member being rotatable by means of a control member located externally of the housing, the end portion of the spindle member passing through the slotted opening being form-fitted in a central receiver in the quantity control plate.

Desirably, the three plates are accommodated in a horizontally divided, compartmentalized housing mounted on the battery housing, the quantity control and temperature control plates being guided during their displacement in the open-topped upper portion of the compartmentalized housing, the lower portion of the compartmentalized housing being disposed over the water inlets formed in the batter housing, the lower portion of the compartmentalized housing having bores formed therein, which bores are coaxially disposed relative to the water inlets. By so doing, the three plates can be removed from the battery housing together with the housing therefor.

Further preferably, the expansion element of the thermostat is disposed in the mixing chamber perpendicularly to the axes of the plates and parallel to and above but fixedly connected to the temperature control plate.

Further advantageously, the expansion element is resiliently supported in the battery housing, one end of the element being fixedly accommodated in a sleeve member, the sleeve member being slidingly mounted in the battery housing, a web member being provided on the sleeve member which engages, in a form-fitting manner a receiver portion formed in the temperature control plate.

Further desirably, the cylindrical receiver formed in the battery housing is sealingly closed above the mixing chamber by means of a top cover member, the spindle member being sealingly guided through the cover member, the spindle member having a cranked portion.

One embodiment of the present invention will be further described, by way of example, with reference to the accompanying drawings, in which.

Figure 1:
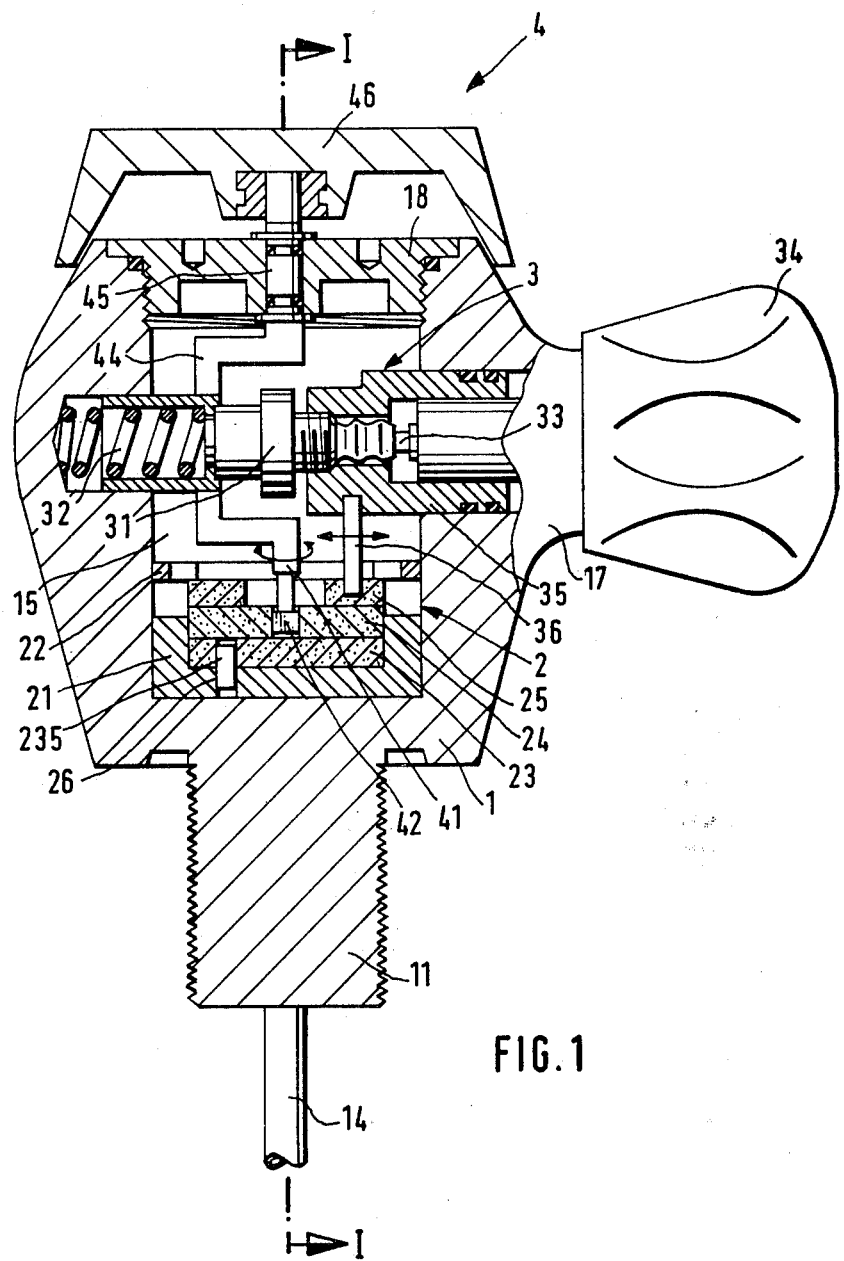
FIG. 1 is a longitudinal section through a mixer battery in accordance with the present invention.
Figure 2:
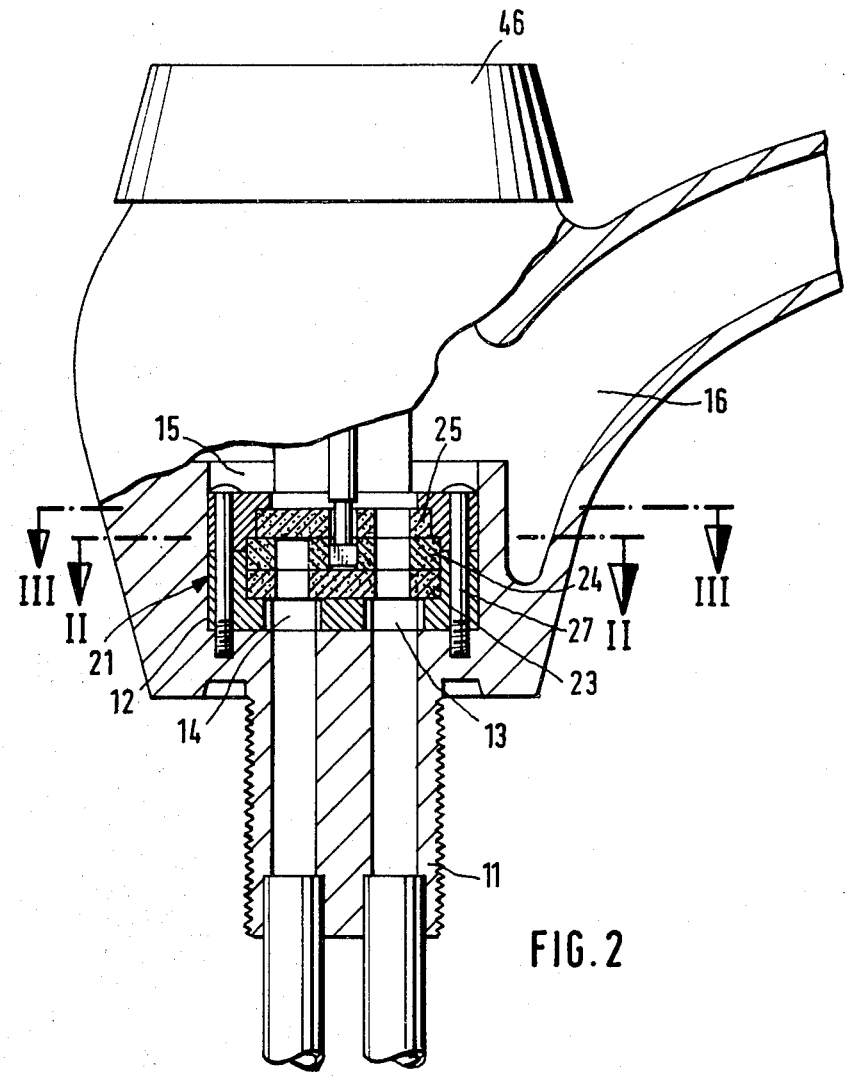
FIG. 2 is a view, partially in section, corresponding to a view taken along the line I—I of FIG. 1.

FIGS. 3 to 5 inclusive, are views of three plates forming part of the battery shown in FIGS. 1 and 2;

FIG. 6 is a section taken along the line II—II of FIG. 2 showing the plate of FIG. 4 in its closed position, and FIG. 7 is a section taken along the line III—III of FIG. 2 showing the plate of FIG. 5 in a mean or central temperature position.

Referring firstly to FIGS. 1 and 2, there is shown a water mixer battery having a housing 1. Within the battery housing 1 is a cylindrical receiver 12. Hot and cold water flows into the receiver 12 through a lower conduit-containing portion 11 of the housing 1. The hot water inlet to the receiver is generally referenced 13, while the cold water inlet is generally referenced 14.

Plate control means, generally referenced 2, are sealingly inserted from above, as seen in FIG. 1, into the receiver 12. The plate control means comprise a compartmentalized open-topped housing 21, 22, the compartment 22 being disposed above the compartment 21. In the compartment 21, a valve seat plate 23 is located below a quantity control plate 24, which, in turn is located below a temperature control plate 25. The plates 23, 24, 25 are sealed one from another. The housing 21, 22 is detachably secured in the battery housing 1 by means of screws 27.

Hot and cold water flows through the corresponding conduits and the inlet bores 13 and 14 respectively in the base of the lower compartment 21 of the housing to valve seats or inlet bores 233 and 234 (see FIG. 3) are formed in the plate 23. The plate 23 is non-rotatably retained in a bore 26 formed in the lower compartment 21 of the housing.

The quantity control plate 24, which is rotatably and sealingly located on the valve seat plate 23, is rotated by means of a spindle 41 forming part of quantity regulating means generally referenced 4. The spindle 41 has a square cross-section end portion 42, which engages in central receiver aperture 245 formed in the plate 24. The plate 24 also has two guide bores 243 and 244 formed therein, the bores being diametrically opposed to one another and lying on a corresponding graduated circle as are the bores 233 and 234 in the plate 23. This plate 24 is rotatably guided in grooves formed in the lower compartment 21 or the upper compartment 22 of the housing.

The temperature control plate 25 is displaceable in a reciprocatable manner on the quantity control plate 24 and, as can best be seen in FIG. 5, has lateral guide faces 251 and 252 which slide on corresponding guide members formed in the upper portion 21 of the housing. A slot-like opening 255 is provided in the plate 25 to allow the end 42 of the spindle 41 to pass therethrough. The plate 25 similarly has two guide bores 253 and 254 formed thereon which are also diametrically opposed, but are capable of rotating through a small angle relative to the fixed position of the inlet bores 233 and 234 formed on the valve seat plate 23.

The temperature control plate 25 is displaced by the thermostat generally referenced 3. An expansion element 31 forming part of the thermostat 3 is disposed perpendicularly to the axis of the spindle 41. One end of the expansion element 31 is supported in the battery housing by means of a biassing spring 32, and the other end thereof is retained in a sleeve 35 slidingly mounted in a pipe 17 on the battery housing 1. Temperature presetting means 33 acts against this latter end of the expansion element 31 such presetting being effected from externally by means of a control member 34. The expansion element 31 or the sliding sleeve 35 affixed thereto, is form-fitted to the temperature control plate 25 by means of a web 36, the web 36 engaging in a further corresponding receiver slot 256 formed in the plate 25.

The spindle 41, which has a cranked portion 44, has an end portion 45 which passes through an upper sealing member 18 for the housing 1 and which is connected to a control member 46. By rotating the control member 46, the spindle 41 causes the plate 24 to rotate and align bores 243 and 244 with the bores 233 and 234 respectively so as to permit hot and cold water to flow therethrough. The water then flows through the bores 253 and 254 of the temperaure control plate 25 and then into a water mixing chamber 15 located above the plate 25. This mixing chamber is in open communication with a water outlet 16. In such a case, the mixed water flows around the expansion element 31 which reciprocates and partially blocks off the cross-sections of the passage for hot or cold water by displacing the plate 25 in depending upon the preselected temperature which has been set.

A thermostatically controlled mixing battery in accordance with the present invention may additionally be provided with known pressure-equalization devices. The control plates are preferably made of ceramic material.

We claim:

1. A thermostatically-controlled mixer battery, comprising:
 a housing defining a mixing chamber and having a hot water inlet bore and a cold water inlet bore formed therein leading to said mixing chamber;
 a thermostatic expansion element mounted in said mixing chamber to permit water to flow therearound, said thermostatic expansion element being adjustable within a preselected operating range so as to permit delivery of a mixture of hot and cold water at a desired temperature;

a control member coupled to, and thermostatically controlled by, said thermostatic expansion element, said control member being displaceable by said expansion element to effect opening and closing of at least one of said hot and cold water inlet bores to said mixing chamber;

a manually operable valve for regulating the quantity of the incoming hot water and cold water, said valve including a plate control means comprising at least one rotatable quantity control plate mounted in said housing and having bores formed therein, said quantity control plate being rotatable from the exterior of said housing and being so disposed as to travel over, in use, said hot and cold inlet bores such that said inlet bores are selectively alignable with said bores in said control plate, and a temperature control plate mounted in said housing and actuated by said control member and, in turn, said thermostatic expansion element, said temperature control plate being sealingly displaceable relative to said quantity control plate and having bores formed therethrough selectively alignable with said bores in said quantity control plate to allow hot water and cold water to pass therethrough into said mixing chamber.

2. A mixer battery according to claim 1, additionally including an outlet from said housing, a cylindrical receiving device mounted in said battery housing, a valve seat plate sealingly located in said cylindrical receiving device, said valve seat plate having bores formed therein which form said hot and cold water inlet bores, respectively, and a pair of hot and cold water inlet conduits provided in said housing over which said bores of said valve seat plate are coaxially disposed, wherein said rotatable quantity control plate is coaxially disposed on said valve seat plate, said temperature control plate is located on said quantity control plate, and is reciprocatably displaceable relative thereto, and wherein guide means are provided for guiding said temperature control plate during said displacement, said bores of said temperature control plate being in open communication with said mixing chamber and with said outlet from said housing.

3. The mixer battery according to claim 2, wherein said temperature control plate has a slotted opening, the major axis of which extends in the direction of displacement of said temperature control plate, wherein said battery additionally includes a rotatable spindle member having one end portion received through said slotted opening of said temperature control plate, and a control member located externally of said housing coupled to said spindle member for effecting rotation thereof, and wherein said quantity control plate has a central receiver formed therein in which said end portion of said spindle member is form fitted.

4. The mixer battery according to claim 2 or 3, additionally including a horizontally-divided, compartmentalized housing mounted in said battery housing in which said temperature control plate, said quantity control plate and said valve seat plate are disposed, said compartmentalized housing having an open-topped portion in which said quantity control and temperature control plates are guided during their displacement, and a lower portion which is disposed over said water inlet bores formed in said battery housing, the lower portion of said compartmentalized housing having bores formed therein, which bores are coaxially disposed relative to said water inlet conduits.

5. The mixer battery according to claim 2, 3 or 4, wherein said expansion element is disposed in said mixing chamber perpendicularly to the axes of said plates and parallel to and above, but fixedly connected to said temperature control plate.

6. The mixer battery according to claim 5, wherein said expansion element is resiliently supported in said battery housing, wherein a sleeve member is slidingly mounted in said battery housing in which one end of said expansion element is fixedly accommodated, wherein said temperature control plate has a receiver portion formed therein, and wherein a web member is provided on said sleeve member which engages, in a form-fitting manner said receiver portion formed in said temperature control plate.

7. The mixer battery according to claim 4, 5 or 6, additionally including a top cover member for sealingly closing said cylindrical receiver mounted in said battery housing which cover is disposed above said mixing chamber, and wherein said spindle member is sealingly guided through said cover member and has a crank handle portion.

* * * * *